United States Patent [19]
Dochterman

[11] 3,867,658
[45] Feb. 18, 1975

[54] DYNAMOELECTRIC MACHINES

[75] Inventor: Richard W. Dochterman, Fort Wayne, Ind.

[73] Assignee: General Electric Company, Fort Wayne, Ind.

[22] Filed: Feb. 14, 1973

[21] Appl. No.: 332,508

Related U.S. Application Data

[63] Continuation of Ser. No. 217,604, Jan. 13, 1972, abandoned, which is a continuation-in-part of Ser. No. 6,660, Jan. 29, 1970, abandoned.

[52] U.S. Cl. ................................... 310/71, 310/86
[51] Int. Cl. ........................................... H02k 11/00
[58] Field of Search ............ 310/42, 43, 62, 66, 88, 310/71, 87, 89, 90, 47, 45, 86, 258, 259, 254; 264/272, 173; 336/107, 192; 174/52.6

[56] References Cited
UNITED STATES PATENTS

| | | | |
|---|---|---|---|
| 2,423,750 | 7/1947 | Benson | 310/42 X |
| 2,948,930 | 8/1960 | Herbst | 174/52.6 X |
| 3,161,843 | 12/1964 | Hodges | 264/272 |
| 3,165,816 | 1/1965 | Thompson | 310/42 |
| 3,333,544 | 8/1967 | Turk | 310/86 X |
| 3,414,746 | 12/1968 | Melvin | 310/62 |
| 3,429,981 | 2/1969 | Shallahamer | 264/272 |
| 3,490,143 | 1/1970 | Hull | 310/42 X |
| 3,520,749 | 7/1970 | Rubenstein | 264/173 |
| R24,909 | 12/1960 | Dochterman | 310/43 X |

*Primary Examiner*—R. Skudy
*Attorney, Agent, or Firm*—Ralph E. Krisher, Jr.

[57] ABSTRACT

Motor includes stator assembly having windings supported on a number of secured together adjacent laminations. A rigid mass of particulate material permeated by adhesive bonding material is adhesively secured to stator assembly and provides a path for effective transfer of heat from the stator assembly. Barrier arrangement, substantially impermeable to a pumped fluid admitted to the interior of the motor, cover or line the bore of the stator assembly and define at least part of the finished bore of the motor. Also disclosed are structures that include securing arrangement, e.g., fastener, termination, and ground path securing arrangement. This may be an insulative material body or metallic member supported on the magnetic core. The metallic or insulative body are mechanically secured to the core. Mold members or parts thereof prevent the formation of a rigid particulate material mass along preselected locales of the securing arrangement.

7 Claims, 14 Drawing Figures

DYNAMOELECTRIC MACHINES

CROSS-REFERENCE TO RELATED APPLICATIONS

This application is a continuation application of my co-pending application Ser. No. 217,604; Jan. 13, 1972; now abandoned which copending application is a continuation-in-part of application Ser. No. 6,660 now abandoned which was co-pending therewith and which was filed Jan. 29, 1970. Also related is application Ser. No. 215,751 now U.S. Pat. No. 3,758,799 tilted "DYNAMOELECTRIC MACHINE" filed in the name of Richard W. Dochterman, et al., on Jan. 6, 1972 as a continuation-in-part of application Ser. No. 6,666; now abandoned and Richard W. Dochterman application Ser. No. 200,525, now U.S. Pat. No. 3,740,599 filed Nov. 19, 1971, and titled "DYNAMO-ELECTRIC MACHINE." Other related applications are: Deuter application Ser. No. 180,770, now U.S. Pat. No. 3,763,080 filed Sept. 15, 1971, and titled "PRESSURE MOLDED ARTICLES, AND MOLD-ABLE COMPOSITION"; Deuter, et al., application Ser. No. 180,728, filed Sept. 15, 1971, now U.S. Pat. No. 3,762,847 and titled "APPARATUS FOR MAKING A MOLDED ELECTRICAL STRUCTURE;" and Swaim application Ser. No. 180,757, filed Sept. 15, 1971, now U.S. Pat. NO. 3,780,323 and titled "INSULATING COVERED DYNAMOELECTRIC MACHINES". All of the related patents identified herein are assigned to the assignee of this application and the disclosures of those patents are specifically incorporated herein by reference as non-essential and background information.

BACKGROUND OF THE INVENTION

This invention relates to inductive devices, e.g., to dynamoelectric machines and, more particularly, to wet motors having an interior that is normally exposed to a fluid; to means for interconnecting an inductive device having housing means comprising a substantially rigid mass of particulate material and another device or supporting means.

In various applications, as discussed, for example, in my Reissue U.S. Pat. No. Re. 24,909 which reissued Dec. 20, 1960, and in Lebkuchner U.S. Pat. No. 3,264,653, corrosive fluids that are to be pumped by a pump-motor assembly are intentionally admitted to the interior of the motor portion of the assembly and are used to lubricate bearing means in the motor. Motors adapted for this use are referred to as "wet motors" and are usually employed in order to eliminate the problems associated with attempting to seal the motor shaft so as to exclude the pumped fluid from the interior of the motor.

One problem encountered in these applications is related to the necessity of isolating the pumped fluid from the stator assembly, e.g., the windings and laminated magnetic core. The severity of this problem is intensified by the fact that the iron or steel normally used to fabricate the core is easily corroded by direct chemical attack and by galvanic action.

One of the suggested approaches for solving this problem has involved surrounding a stator assembly with a material such as epoxy and then machining, to desired tolerances, a bore in the surrounding material. Another approach has involved pressing a stator assembly into an extensively and accurately machined cast iron housing, and then securing a stainless steel sleeve in the bore of the stator assembly. With this approach, O-ring seals are employed to form a fluid-tight seal between each end of the sleeve and the housing. The interior of the sleeve has then defined a first chamber with the pumped fluid being admitted thereto. The cast iron housing and outer surface of the sleeve have defined a second chamber from which the pumped fluid is excluded and in which is positioned the stator assembly.

However, neither of these general approaches has been completely satisfactory in practice. One reason for this is that epoxy type covering materials used in the one approach are not generally good conductors or dissipators of heat. In addition, it is necessary to machine the covering material in the vicinity of the stator bore, and this has been a relatively critical operation since extreme care must be used to attain a finished bore that is concentric with the stator iron bore and to prevent exposure of the stator iron. It will be understood that during a machining operation of this type, any deviation from exact alignment between the work piece and tool results in a finished coated bore eccentric with respect to the stator iron bore. Furthermore, a high degree of care must be used to prevent removal of the desired thin layer of covering material and exposure of the stator core, and particularly so if eccentric bore conditions are present.

In the two chamber approach, the wound stator core is located in a dead air space which serves to thermally insulate the stator assembly and reduce the heat transferred from the windings. Furthermore, this approach is relatively expensive, because of the use of sealing rings and because of the large number of surfaces in the housing that must be accurately machined so as to provide a fluid-tight seal in practice.

In solving the above and other problems and in carrying out, inter alia, various objects of the present invention discussed hereinafter, I have provided an inductive device composite structure that includes a tightly knit, substantially solid mass of particulate material. When the solid mass is relatively hard and non-ductile, difficulty may be encountered when attempting to secure threaded or other conventional fasteners to the mass. For example, it may be desirable to mount a capacitor, terminal box, and/or capacitor cover to such solid mass. Alternatively, it may be desirable to fasten the inductive device to supporting means. It thus would be desirable to provide securing means for fastening another device or supporting means with the inductive device.

It may be particularly desirable to provide a convenient means for establishing an electrically conductive grounding path for at least one of the components of an inductive device, e.g., a magnetic core that is covered by a substantially rigid mass of particulate material. It would also be advantageous to economically provide electrical termination supporting means, when desired, in conjunction with the grounding path providing means, securing means, or with means that may be used to provide at least one grounding path and a securing means arrangement.

SUMMARY OF THE INVENTION

It is a general object of the present invention to provide improved inductive devices, e.g., dynamoelectric machines, having one or more of the desirable features described above.

It is a specific object of the present invention to provide an improved wet motor characterized by improved heat dissipation characteristics.

It is another object of the present invention to provide a new and improved wet motor having a housing that is corrosion resistant, that has low fluid, e.g., water, absorption characteristics, that has a finished bore surface substantially impervious to fluids, and that is characterized by enhanced structural integrity.

A further object of the present invention is to provide an improved wet motor wherein particulate material is packed around a wet motor stator assembly to promote the transfer of heat away from the stator assembly.

Yet another object of the invention is to provide an improved motor having rigid housing means formed of particulate material and barrier means defining at least a portion of the finished bore of the motor.

A further object of the present invention is to provide an improved dynamoelectric machine or other inductive device having a covering formed of a substantially rigid particulate material mass and having securing means embedded therein.

A still further object is to provide such a device wherein the securing means may be utilized to provide a grounding path and/or termination supporting means.

In carrying out the objects of the invention in one form, I provide a motor particularly suitable for use in a wet motor and pump assembly. An illustrated preferred embodiment includes a stator assembly comprising a laminated core and windings supported thereon. Surrounding the windings and at least the outer periphery of the stator core is a substantially rigid mass of particulate material which is exemplified herein as a mass of sand particles forming housing means around the stator assembly without a peripheral casing or additional covering therearound. The sand particles are secured together and to the stator assembly by a resinous material. The sand particles are packed against the windings, stator core, and each other, and form an interstitial mass with the resinous or bonding material substantially filling the interstices of the mass. The resulting stationary composite structure so formed has a relatively low water absorption characteristic and good structural integrity. Bearing means support the rotor for rotation relative to the housing means and are secured to the housing means by a thermosetting resinous material such as epoxy. This arrangement permits the permanent securement of the bearing means to the housing means in a substantially stress-free condition and facilitates the concentric placement of the rotor in the finished bore.

Barrier means in the form of a sleeve, a layer of laminated material, or a layer of any other suitable material substantially impermeable to the pumped fluid, line the bore of the core and define at least the part of the finished bore of the motor adjacent to the core in order to protect the stator core from corrosion resulting from exposure to the pumped fluid.

In other forms, different embodiments of which are illustrated; I provide structures that include securing means, e.g., mechanical securing means, termination support or securing means, and ground or ground path providing or securing means. In a preferred illustrated embodiment, these means are provided by an insulating material body supported on a magnetic core. The insulating material body may be formed in place on the core or otherwise held in place thereon, e.g., by placing it in a peripheral recess (such as a slot or keyway) or by placing it on a projection such as a key or wedge on the core.

In the practice of a method, a wound core and securing means (whether formed of metal or not) held in place thereon are positioned in a mold cavity; a mixture of resinous and particulate material is admitted to the cavity, a tightly knit substantially rigid particulate material mass is formed, and the mold cavity is thereafter emptied. Depending upon the configuration of the securing means utilized, mold members or parts thereof are provided that prevent the formation of a rigid particulate material mass along preselected locales of the securing means. The preferred method then also includes orienting the core relative to such mold members or parts prior to admitting the particulate and resinous material mixture.

The subject matter which I regard as my invention is set forth in the appended claims. The invention itself, however, together with further objects and advantages thereof may be better understood by referring to the following more detailed description taken in conjunction with the drawings.

DESCRIPTION OF THE PREFERRED EMBODIMENTS

Figures 1, 2, 3, 4:
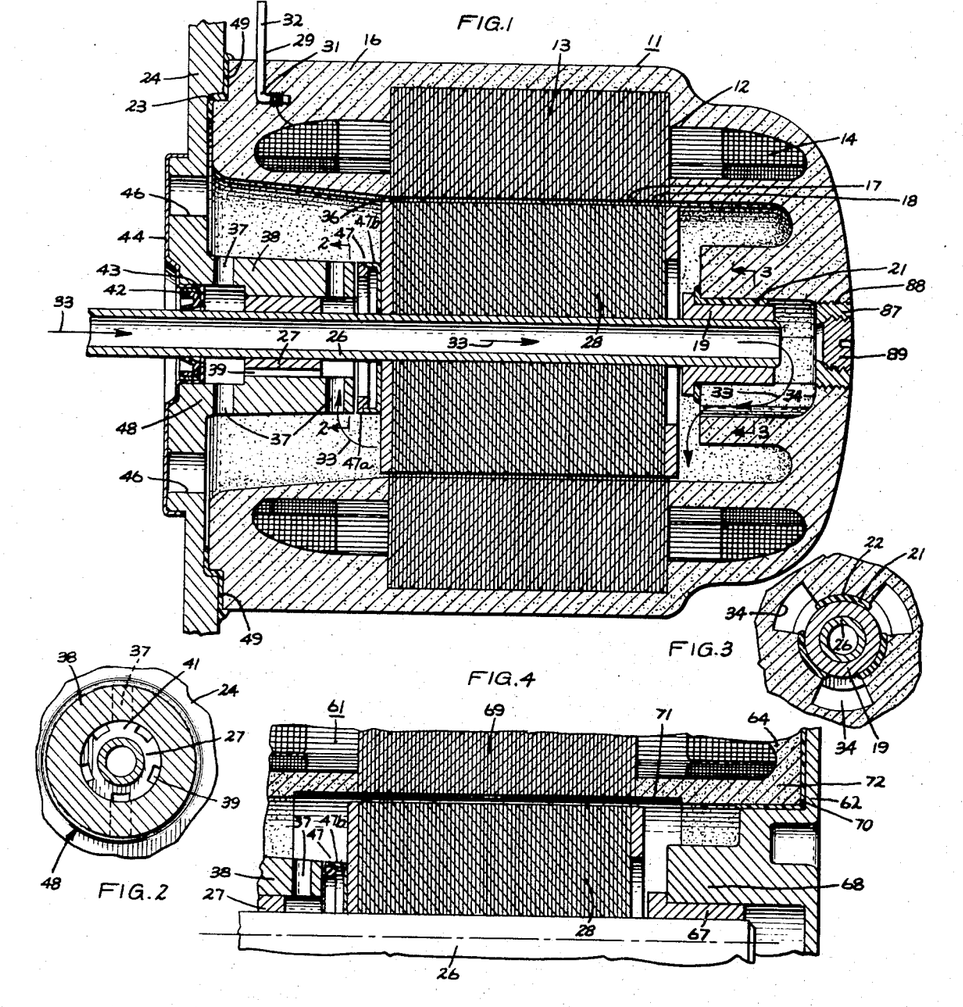
FIG. 1 is a side elevation, in section, of a motor embodying the invention in one form.
FIG. 2 is a sectional view taken along the line 2—2 of FIG. 1, assuming FIG. 1 to be shown in full.
FIG. 3 is a sectional view taken along the line 3—3 of FIG. 1, assuming FIG. 1 to be shown in full.
FIG. 4 is a side elevation, in section and with parts broken away, of another motor embodying the invention.

Referring now to FIGS. 1, 2 and 3, there is illustrated a wet motor 11 that includes a movable asembly comprised of a rotor and shaft, and a stationary composite structure 12 comprising a stator assembly formed of a laminated core 13, comprising a number of adjacent laminations secured together by the housing means of the motor or other means conventionally used for this purpose, and windings 14. The stationary composite structure 12 also includes housing means formed of a mass 16 of sand particles adhesively bonded to one another and to the stator assembly, and barrier means defining a part 17 of the finished bore coextensive with the bore of the stator core for protecting the stator core from corrosion caused by exposure to the fluid being pumped and for preventing moisture penetration between the adjacent core laminations. This barrier means is illustrated as a coating 18 of nickel lining the bore of the stator core. The bearing system for the motor 11 includes bearing means in the form of a sleeve bearing 19 secured by a suitable thermoresponsive structural adhesive material 21 to lands 22 formed in the housing means. The same adhesive material used to mount the sleeve bearing 19 is also used as denoted at 23 to secure the end frame of plate 24 to the housing means. Examples of some adhesive materials particularly suitable for this purpose are set forth in detail in Thompson et al., U.S. Pat. No. 3,176,172.

The end plate 24 may also conveniently be employed as part of the pump casing or housing surrounding a not shown pump impeller secured to the hollow shaft 26. The shaft is supported in a sleeve bearing 27 pressed into the end plate and the bearing 19. The rotor 28, of conventional design and suitably treated for resistance to corrosion as described, for example, in my aforementnioned patent or in the referred to Lebkuchner aforementioned rotates when a source of excitation current is applied to the windings 14 through termination means that include a plurality of terminals 29 each having a portion 31 embedded in the housing means and an exposed portion 32.

During initial operation of the motor 11, the hollow shaft 26 communicates with the pumped fluid, and provides a means for transferring the fluid into the motor as generally indicated by arrows 33 in FIG. 1. The fluid moves through and out of the shaft, through channels 34 between adjacent bearing supporting lands 22, through the air gap 36 between the rotor and finished bore surface, and through passages illustrated as holes 37 formed in the bearing support 38 and through channels 39 between adjacent lands 41 on the front sleeve bearing 27. The bearings are exemplified as being formed as described, for example, in the Lebkuchner patent, of a suitable porous material. The pumped fluid passes through this porous material and, particularly when in liquid form, lubricates the bearing surfaces thereof.

After the interior of the motor has been inundated with the pumped fluid, continued flow of the fluid is substantially impeded and, preferably, prevented by a conventional seal 42 pressed into a cavity 43 in a cover plate 44 and resiliently engaging the outer diameter of the shaft 26. The cover plate 44 preferably is formed of a corrosion resistant material, such as stainless steel, and is press or shrink fitted onto the end plate 24 which for ease of fabrication is formed of cast iron. The cover plate 44 itself restricts the transfer of fluid between the pump and motor cavities by covering shim removal opennings 46 in the end plate 24 that are used for removal of shims from the air gap 36 during motor assembly, as will hereinafter be more fully described. The primary reason for providing the sealing means is to restrict the movement of materials such as scale, rust, or other particles into the air gap or bearing structure when the pumped fluid is a liquid, e.g., water or other liquids.

Fabrication of the motor 11 is accomplished by assembling together the sleeve bearing 19, shaft and rotor assembly, a conventional thrust system 47 including a low friction (e.g., phenolic) washer 47a and means for interlocking it with the rotor. This latter means is illustrated as a drawn cup 47b. The adhesive material 21 is applied to either the lands 22 of the housing or bearing 19 and the material 23 to either the mounting surface 49 of the housing or end plate 24. After this step, end plate 24 and bearing subassembly 48 are assembled together, in an unstressed condition, in the relative positions shown in FIG. 1, with not shown shims positioned in the air gap 36 and concentrically locating the rotor 28 in the finished bore. After the adhesive material 21, 23 has hardened, the shims are removed along a path extending from the air gap 36 to the shim removal openings 46 axially aligned with the air gap. The openings 46 are sufficiently large to permit the removal of the shims and are angularly spaced at 90° intervals in the end plate 24 around the air gap. After the shims have been removed, the stainless steel cover plate 44 is pressed onto the end plate 24 to close the shim removal openings, and the seal 42 is pressed into the cover plate 44 as previously described.

In the exemplification, the terminals 29 have a portion 31 embedded in the adhesively bonded sand mass 16 and electrically connected to ends 51 of the winding 14. The portions 32 of the terminals may then be connected to a power source directly or connected to other terminations disposed in a junction box that may be secured to the motor housing. Since the terminals 29 are firmly secured in the sand mass 16, it is difficult, if not impossible, to dislodge them from the motor structure. Even more importantly, it is virtually impossible to break the electrical connection between the windings and terminals. Furthermore, the terminals are sealed in the housing and thus further insure that fluid within the motor cannot escape therefrom. It will be understood, therefore, that the illustrated arrangement offers a significant advantage over conventional designs.

Although sand has been illustrated and described as the particulate material used in the formation of the motor 11, a wide range of inert particulate materials may be used in practice. Desirably, the material selected should withstand the temperatures encountered during manufacturing operations and not deleteriously affect the stator core, windings, terminations, or insulation used on the windings or stator core. In addition, the inert material should not be electrically conductive or magnetic. In general, these same criteria also govern the selection of the particular resinous or adhesive material used to adhesively bond or otherwise secure the particles of particulate material together. One type of low cost particulate material commonly available in bulk form that resists corrosion by many fluids and thus is particularly suitable for use is granular refractory material such as sand. Examples of this type of material, in addition to sand, are mineral ores and various kinds of rocky material.

In the illustrated embodiment, the particles of sand are packed against each other in random fashion, and an essentially transparent thermo-responsive adhesive material is disposed in the interstices of the sand mass. In general, the sand or other particulate material employed may have a wide range of particle sizes and particle size distribution. However, it is desirable to use particulate material wherein about fifty percent by weight of the particles have a size of from 40 to 100 mesh, and it is preferred that such material have an American Foundrymen's Society (A.F.S.) fineness of from 45 to 55 or at least 45, since the surface textures of structures wherein the particulate material has a grain fineness in this range is difficult to distinguish from the surface texture of permanent mold cast iron structures.

An economical and therefore preferrred particulate material in the exemplification is river bed whole grain sand having a silica ($SiO_2$) content of from 90% to 98% by weight, substantially no metallic salts or copper, up to about 2% by weight clay, and traces of various elements and compounds. In preparing the sand for use, it is desirable to dry the sand and then discard the extremely course particles in order to eliminate variable surface textures caused by large particles and to consistently record only the dry weight of the sand used. Accordingly, the sand is dried at 400°F. in a conventional Ferris wheel forced air dryer. After this treatment, the moisture content of the sand is about 0.03% by weight and the dust level is about 0.3% by weight. After drying, the sand particles retained on a 30 mesh screen should be discarded and the remainder used in constructing the motor. A typical sieve analysis of a sample of sand particles suitable for use is set out in Table I below which is presented for purposes of illustration. Standard procedures were followed in making the sieve analysis and, since 30 mesh size particles and larger were discarded prior to the analysis, 100% of the samples tested passed through a 30 mesh screen. The data for two samples is presented in Table I and the last two columns in Table I represent an average value of the recorded data for the two samples.

chromite ore has been used in lieu of sand to produce a structure black in color and having a surface texture very similar to castings of permanent mold cast iron. The structural characteristics of such structure were comparable to the structural characteristics of structures wherein sand was used as the particulate material.

For purpose of economy, sand having the previously noted size distribution is preferred, but satisfactory results may also be obtained when the particulate material particles are of substantially uniform size. The primary criteria for selection, in addition to economic factors, is the structural integrity an final appearance of the motor housing means. For example, if only particles larger than 30 mesh were to be used, it is believed that the surface texture of the housing would be objectionably course and rough unless excessive amounts of resinous materials were used to secure the particles into a substantially solid mass and to smooth out the "valleys" between adjacent particles adjacent the surface of the bonded mass. This in turn would be uneconomical and result in what is best described as an objectionable "resin-rich" surface.

Based on test samples of substantially solid, secured together sand masses, it is also believed that when all of the particulate material is substantially finer than 100 mesh, there will be an objectionable loss of structural integrity of the final structure. A readily apparent manifestation of this loss is the occurrence of fissures and surface crazes in the bonded mass after the adhesive material has hardened. It should be added, however, that structures having apparently satisfactory structural integrity (characterized, e.g., by a smooth surface texture and resistance to cracking, breaking, or crumbling) may be obtained when substantially all of the particles of particulate material are 100 mesh size. Therefore, it is also believed that when a substantial percentage or all of the particulate material is finer than 100 mesh, additional means should be used to prevent the development of fissures and crazes in the final structure. By way of illustration, one material which is suitable for use as this additional means is glass fiber such as that discussed in Rudoff, et al., U.S. Pat. 2,820,914.

Many materials are suitable for use as a material for securing the sand particles together and to the stator core 13 and windings 14. It is quit desirable that the material selected, regardless of its exact composition,

TABLE I

| Screen Mesh Size | % of Sample Retained | | Cumulative % Passing Through | | Average | |
|---|---|---|---|---|---|---|
| | Sample A | Sample B | Sample A | Sample B | Sample Retained % | Cumulative Passing % |
| 30: | 0 | 0 | 100 | 100 | 0 | 100 |
| 40 | 16 | 18 | 84 | 82 | 17 | 83 |
| 50 | 26 | 24 | 58 | 58 | 25 | 58 |
| 70 | 32 | 34 | 26 | 24 | 33 | 25 |
| 100 | 20 | 20 | 6 | 4 | 20 | 5 |
| pan | 6 | 4 | — | — | 5 | — |

Although sand is a preferred particulate material, it will be understood that other suitable inert particulate materials could also be used. Such materials might include, for example, slate; chalk; zirconia; alumina; calcium carbonate; mica; beryllium oxide; magnesium oxide; or combinations of such materials; or naturally occurring combinations of minerals, e.g., ores. In fact, have the following attributes: that it economically secure together the inert particles into a substantially solid mass; that it secure or bond the particles to the windings and stator core; that it be compatible with and not adversely affect other parts such as the electrical insulation, winding components, core, and the like (that is, it should be inert with respect to such other parts); and that it satisfactorily withstand temperatures to which it is to be subjected during fabrication, testing, and use of the completed motor. In addition, the viscosity of the selected material should preferably be such that it will be readily retained in the interstitial mass so as to form a rigid structure essentially non-porous and having low moisture absorption characteristics after the material has hardened. It has been found that two part thermo-responsive materials of the thermosetting synthetic resinous type provide these attributes.

When a two part thermosetting resinous material is employed, suitable base resins for this material may include phthalic or non-phthalic type polyesters, epoxys (e.g., bisphenol A, novolac, cycloaliphatic), certain phenolics, polybutadienes, epoxy-acrylics, and epoxy-polyester resins.

A typical two part thermosetting resinous material that has been found to be useful in making rigid motor structures includes, in addition to a base resin as mentioned above, a component to increase the flexural strength of the resinous material when cured, a catalyst to shorten the time required to cure or harden the resinous material, and an agent to facilitate removal of the composite structure from a mold.

One specific resinous material used included 55 parts by weight polyester resin as the base resin mixed together with 45 parts by weight of styrene (used to increase the flexural strength). To 99 parts by weight of this mixture was added 1 part by weight of a catalytic agent in the form of tertiary-butyl-perbenzoate and then 99.45 parts by weight of the foregoing 3 part mixture were mixed with 0.55 parts by weight of a mold release agent. A commercially available mold release agent is marketed under the name "Zelec" by the E. I. DuPont de Nemours and Company, Organic Chemicals Department, 7 South Dearborn St., Chicago, Ill. However, it should be specifically noted that satisfactory motor structures have been obtained without using any mold release agents both in DuPont "TEFLON" material coated molds and in uncoated molds.

One commercially available polyester resin that has been used in a non-phthalic polyester comprising mono-basic and poly-basic acids and polyhydric alcohols, and sold as polyester casting compound No. 519-C-111 by Con Chemco, 1401 Severn St., Baltimore, Md. Another suitable commercially available base resin is marketed under the name "Derakane" by the Dow Chemical Co. of Midland, Mich. This particular material is described in detail in U.S. Pat. NO. 3,367,992, to C. R. Bearden which discusses 2-hydroxyalkyl acrylate and methacrylate dicarboxylic acid partial esters and oxyalkylated derivatives thereof. This patent issued Feb. 6, 1968 and is assigned to the Dow Chemical Co.

Stationary composite structures comprising tightly knit sand masses surrounding stator cores and windings having satisfactory structural characteristics have been formed using about 71.2% by weight of sand and 28.8% by weight of the resinous material. After the pores in the sand mass were permeated by the resinous material, the resinous material was retained in the pores or interstices of the sand mass and hardened by heating the stationary composite structure at 190° for 25 minutes. It will, of course, be understood that different temperatures and varying amounts of catalyst may be used to shorten or lengthen the cure time as desired.

The actual percents by weight of particulate material and resinous material may be varied. The most convenient method of determining the proportions of these materials that yield the most satisfactory results is to compare the physical characteristics of stationary composite structures that are made in trials during which the proportion of resinous to particulate material is varied. Since the resinous material, particulate material, winding support, and windings are compatible with each other, the more desirable relative proportions of the materials can be determined by physical inspection and structural testing. In general, it is believed that the most economical use of materials, better heat dissipation characteristics, and better structural integrity (i.e., crack-free and corrosion resistant surfaces, uniform relatively smooth surface textures, resistance to crumbling, crushing, shattering, or breaking) result when a maximum amount of particulate material and a minimum amount of resinous material is employed. When this is done, there will be substantially no more resinous material than that required to occupy the voids or pores (i.e., the interstices) between adjacent particles of the particulate mass. If insufficient amounts of resinous material were to be used, the resulting structure would be porous and readily absorb pumped fluids in wet motor applications. In addition, particles of particulate material could be scraped from the surfaces; and in extreme cases, the secured together mass would not be tightly knit and would crumble or fragment when dropped.

The importance of preventing the release of even a single piece of particulate material from an interior surface of motor will be appreciated when it is understood that the air gap or clearance along the finished bore of a motor often is nominally only about .011 of an inch. Thus, the presence of particulate material, and particularly abrasive refractory material such as sand in the air gap during operation of a motor could result in severe damage, if not destruction, of the motor. For example, noise, binding and freeze up of the shaft in the bearing, and locked rotor conditions might result. If too great an amount of resinous material were used, the external surfaces of the composite structure would be "resin-rich" and be smooth and glassy in appearance. This effect would be particularly objectionable when other structural elements (e.g., bearing means or end frames) are to be adhesively secured to the structure.

The volume of the above described interstitial mass is determined essentially by the apparent volume occupied by the particulate material. Thus, the density or specific gravity of the interstitial mass permeated with adhesive material is greater than the bulk density of the particulate material. For example, the bulk density of dry sand that was used in actual motor structures was approximately 1.6 grams per cubic centimeter. However, the density of a section of the bonded sand mass in such motor structures after hardening of the adhesive material was approximately 1.9 grams per cubic centimeter.

In bulk form, samples of this sand mass had an interstitial volume, i.e., porosity or pore volume of about 34%. Since the material used to secure together the sand particles desirably occupies the interstitial volume of the sand mass, a section of the rigid mass after curing of the resinous material would comprise, on a volumetric basis, about 34% of adhesive material and about 66% of sand particles. After curing, this material was found to absorb only about 0.7% by weight of moisture and thus was determined to have relatively low moisture absorption characteristics.

Motors constructed with the described materials have much improved heat dissipation characteristics. In one specific test, it was determined that stator assemblies surrounded by a sand mass as described herein were over 15% more efficient in power or heat dissipation than were stator assemblies pressed into a cast iron housing. Furthermore, the sand mass surrounded motors will satisfactorily withstand severe shock loading and can withstand physical abuse without sustaining damage to the structural or electrical components thereof. One example of such abuse is the mishandling of motors (including wet motors) during manufacture and shipment. It will be readily appreciated that internal winding damage or cracks in the housing would render a motor useless for wet motor as well as other applications.

Once again reference to FIG. 1, the finished bore surface of the motor 11 adjacent to the stator core 13 is desirably substantially impervious to moisture and barrier means are provided for preventing moisture penetration of the stator core laminations and to provide durable protection for the laminations from corrosion, e.g., destruction of the lamination material by direct chemical attack or by galvanic action. Accordingly, barrier means for isolating the stator core from pumped fluids, i.e., for preventing pumped fluid from reaching the stator core 13, are illustrated as comprising a lining or coating of corrosion resistant, non-porous fluid impervious material such as nickel, that is relatively passive to corrosion. This material should be non-magnetic and may be applied in any suitable manner. In the case of thin metallic coatings, conventional plating of flame spray plasma coating manufacturing processes may be employed with the barrier means being deposited directly onto the bore of the stator core. This may be done before or after formation of the sand mass and the thickness of the coating should be as thin as possible to maintain a small air gap 36 in the interest of efficient motor operation. Of course, the coating should also be thick enough to provide effective isolation between the stator core and pumped fluid over the anticipated life of the wet motor under normal use conditions.

Rather than depositing a passive metallic material, a synthetic material such as an epoxy resin may also be employed as the barrier means in the FIG. 1 exemplification. Examples of ways in which this type of material may be applied to the stator core 13 are described in detail in DeJean, et al., U.S. Pat. No. 3,355,310 issued Nov. 28, 1967 and Bender, et al., U.S. Pat. No. 3,355,309 issued Nov. 28, 1967.

FIG. 4 illustrates another motor 61 embodying the invention and which differs from the motor 11 in that the housing means 64 includes a cast iron end frame 62 secured by a structural adhesive material 70 to the rigid sand mass 72 in the same manner and with the same materials as the end plate 24. With this arrangement, a bearing 67 having lands thereon similar to the lands 41 on the bearing 27 is pressed into the bearing support 68 formed in the end frame 62.

The motor 61 also differs from the motor 11 in that the barrier means for isolating the stator core 69 from the pumped fluid is illustrated as comprising a layer of laminated material 71 such as the material marketed commercially by the Minnesota Mining and Manufacturing Company as SCOTCH-WELD lamination adhesives AF-114FR and AF-115FR. These materials are described by the manufacturer as thermosetting non-volatile; flame retardant, modified epoxy laminating adhesives and glass cloth combinations. The fluid impervious material 71 is preferably applied to the bore of the stator core after formation of the rigid sand mass 72 by any suitable method, some of which are set forth in the referenced copending Dochterman and Wendt application.

Figure 5:
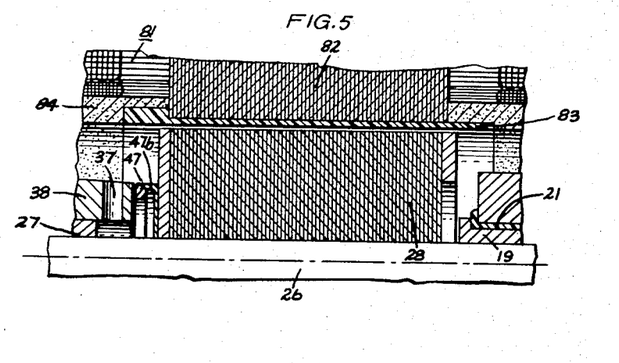
FIG. 5 is a side elevation, in section and with parts broken away, of still another motor embodying the invention.

FIG. 5 illustrates still another motor 81 embodying the invention. The motor 81 is substantially the same in all respects as the motor 11 with the exception that the barrier means for protecting the stator core 82 is embodied in still another form. Accordingly, as was done in the case of motor 61, identical reference numerals have been applied to parts that are identical to parts of the motor 11 and which are not specifically mentioned in the discussion of FIGS. 4 and 5. In FIG. 5, the barrier means is shown in the form of a sleeve 83 bonded and sealed in place in the bore of the stator assembly prior to curing the resinous material used to secure together the sand mass 84 and stator assembly. It will be appreciated that the sleeve 83 may be made from any suitable cast or formed ceramic material, synthetic material, or a corrosion resistance metal or alloy.

In the manufacture of the motor 81, it is more convenient to position the stator assembly and preformed sleeve 83 in a mold and thereafter form the resin and sand mass 84 around the stator assembly, either by means of a gravity feed and air pressure process, centrifugal process, or pressure molding process as described in the above identified related Dochterman and Wendt, Deuter, or Deuter and Shaffer applications.

During fabrication of the motors 11, 61 and 81, means can alos be provided that facilitate venting during the sand mass molding process (in the case of motors 11 and 81) and venting or bleeding of air from the motor when a fluid inundates the motor. In FIG. 1, this means is illustrated as an internally threaded bushing 87 that is threaded or knurled on the outer surface 88 thereof. The bushing is molded in place in the sand mass 16, and a conventional vent plug 89 is threaded into the bushing. The plug 89 may then be used in a conventional manner to vent or bleed air from the interior of the wet motor 11.

Now turning to FIGS. 6-14, other exemplifications of the invention and novel methods of practicing the invention in preferred forms will be described.

In some applications of the motors illustrated in FIGS. 1, 4, and 5, it is desirable to operate the motors as permanent split capacitor motors. In these and other applications it may also be desirable to provide a terminal, junction, or conduit box within which connections to a conventional external power source may be made. In both of these applications, as well as in others, it may be desirable to provide securing means by which a capacitor, capacitor cover, conduit box, or other device (including motor mounting means) may be secured to the motor.

Figure 6:
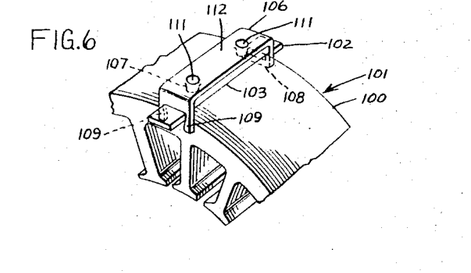
FIG. 6 is a perspective view, with parts broken away and parts (e.g., winding turns) removed, of a dynamoelectric machine core and securing means.
Figure 7:
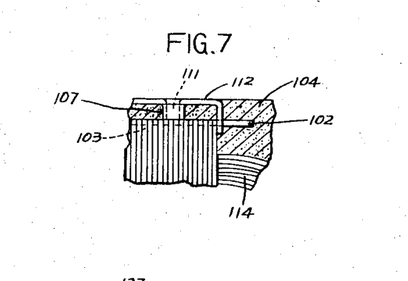
FIG. 7 is a sectional view, with parts broken away, of the structure of FIG. 6 and shows winding turns and a substantially rigid particulate material mass in place around the core.
Figure 8:
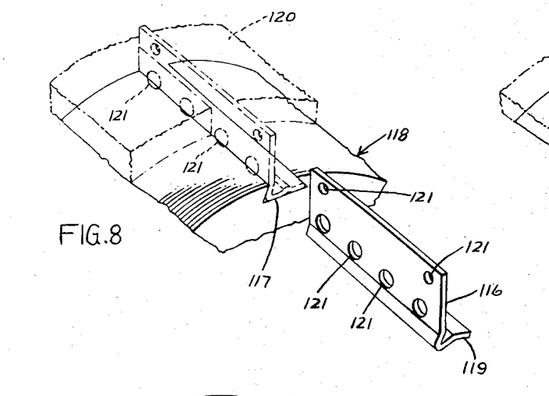
FIG. 8 is an exploded perspective view; with parts removed, broken away, and shown in phantom; of another embodiment of the invention.

FIGS. 6 and 7 illustrate one embodiment that facilitates achievement of this advantageous result. In FIG. 6, the laminated magnetic core 100 of motor 101 is provided with at least one flat member or strip 102 in a keyway or groove 103 of the core. The strip 102 may be utilized in holding together the laminations 100 of core 101, if desired, in the manner described, e.g., in Ross U.S. Pat. No. 3,313,967. However, this is not necessary for the practice of the present invention since the strip 102 and core 101 are held in substantially permanent fixed relationship by a solid sand and resin mass 104 like the mass 16. It should be specifically noted, however, that various sizes and configurations of strip members or keys and peripheral recesses or keyways may be used if desired. Accordingly, "channels" may be utilized as described, e.g., in Wightman, et al., U.S. Pat. No. 3,343,013. Also embedded in the mass 104 is a securing means in the form of a strap 106 having means formed therein for receiving fasteners (e.g., self-tapping screws) and for providing a ground path to the core 100. In the motor 101, this last mentioned means is in the form of bosses or extrusions 107 that extend in close proximity to the core 100.

The strap has been illustrated as having an opening 108 in one end thereof in which an end of strap 102 is disposed and a pair of jaws 109 that are snapped onto strap 102. In this respect, at least, the strap 106 may be similar to clips of the type disclosed in my U.S. Pat. No. 3,740,599, and, accordingly, may be formed of about 0.030 of an inch thick steel.

With reference now to FIG. 7, it will be noted that the fastener receiving apertures 111 of bosses 107 are kept open and free of sand mass 104. This may be accomplished by placing the core 100 in a mold cavity with a surface or land formed therein that is complimentary to the surface 112 of the strap adjacent to the apertures 111. In effect, the mold cavity surface then seals the openings of the apertures 111 and prevents movement of particulate or resinous material into the apertures. Also, the close spacing between the bosses 107 and strap 102 prevents the deposit of particulate material and resin in the apertures 111. Thus, unobstructed fastener receiving means are provided that are securely embedded in the mass 104. These means may be used to mount auxiliary devices to the motor 101 or to assist in securing the motor to a supporting structure.

The fastener receiving or securing means also establish a means for providing an electrical ground path or circuit for the core 100. For example, a conductive fastener (e.g., a self-tapping steel screw) received in an aperture 107 may be used to ground the core 100 by means of an electrically conductive path through the screw, strap 106, and steel strap 102. Alternatively, the fastener may project from a boss 107 and directly contact strap 102. Then, in the event that one or more of the winding turns 114 becomes short circuited to the core 100 during operation, the core 100 will provide a low resistance electrical path to ground. This may be particularly desirable for some applications or to more conveniently meet the standards of at least one well-known testing laboratory, as discussed in Dochterman and in U.S. Pat. No. 3,758,799.

Figure 9:
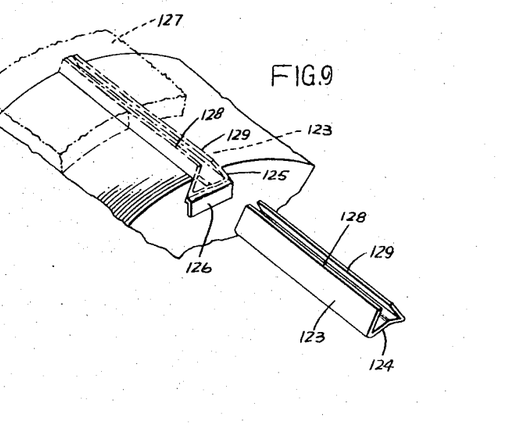
FIG. 9 is a view, similar to FIG. 8, of still another embodiment of the invention.

FIG. 9 reveals another embodiment where the illustrated securing means are in the form of a generally L-shaped steel strap 116. In this arrangement, strap 116 is slid into the relatively shallow dovetail slot 117 in core 118, and leg 119 of strap 116 is stressed (e.g., by straightening), as will be understood, to wedge the leg in the illustrated peripheral recess (slot 117) of the core.

Thereafter, a rigid and solid sand resin mass 120 is formed as a protective covering for the core 118 and windings thereon. The mass 120 embeds the strap 116 and lies in the holes 121 to assist in anchoring the strap to the core. Apertures 121, on the other hand, provide predeterminedly located means for receiving any suitable fastener and/or ground connection.

In the embodiment of FIG. 9, still another securing means in the form of strap or channel 123 is shown. With this arrangement, leg 124 of channel 123 is expanded or flattened in peripheral recess 125 (in a fashion similar to that of leg 119 in FIG. 8) on top of strap 126. Thereafter, a dovetail shaped key in a mold is utilized to keep particulate material and resin mass 127 out of the channel and to keep one end open. Then, fasteners may be screwed or wedged into the narrow aperture defined between edges 128, 129 of the channel. Alternatively, a nut, headed stud, or other fastener may be slid into the open end of channel 123 to provide variable spaced fastening means. In both cases, the channel 123 also provides a ground circuit path since it may be formed of 0.030 of an inch carbon steel.

Figure 10:
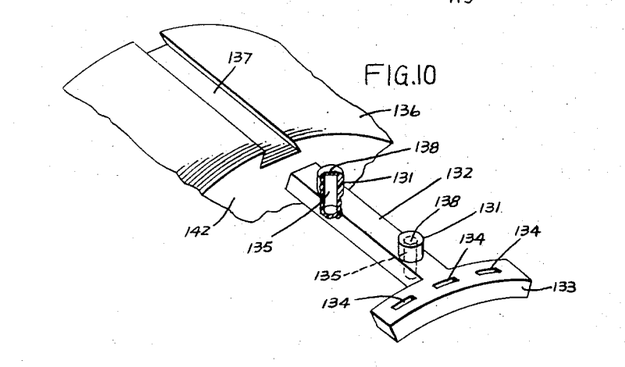
FIG. 10 is an exploded perspective view (with parts broken away and removed) of yet another embodiment of the invention.
Figure 11:
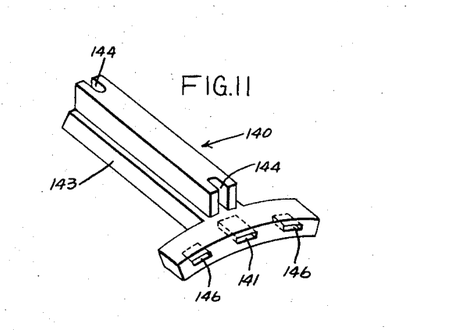
FIG. 11 is a perspective view of a securing means that may be used in lieu of the securing means shown in FIG. 10.
Figures 12, 14:
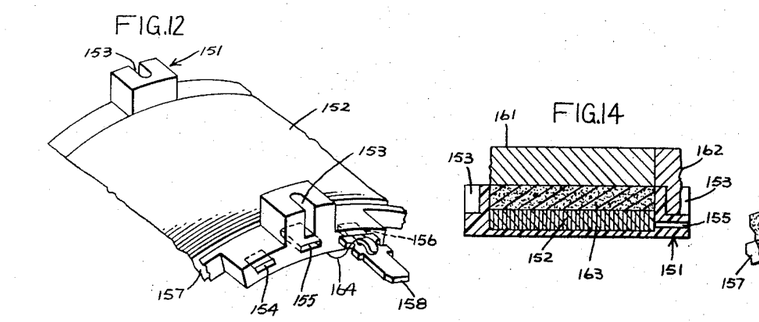
FIG. 12 is a view, with parts removed and parts broken away, of still another embodiment of the invention.
FIG. 14 is a view taken generally in the direction of the line 14—14 in FIG. 13, and also partially shows parts of a mold that may be used.

In FIGS. 10-12, resin and particulate material masses and other parts have been omitted, but it will be understood that the securing means of these FIGS. as well as of FIGS. 6-9 may be used in arrangements with or without a particulate material covering.

The securing means of FIG. 10 provides fastener receivers in the form of bosses 131 formed on plastic strap 132. This securing means also provides termination support means in the form of terminal block 133 with terminal receiving apertures therein; and a ground path through apertures 135 to the core 136 when the strap 132 is placed (e.g., wedged) into peripheral recess 137 of core 136.

It should be noted that thin webs or knock-outs 138 are also provided so that apertures 138 are initially blind holes. These webs will prevent the movement of particulate material and resin into apertures 135 during a molding process.

Preferably, strap 132 and its associated parts are formed from a plastic material that may be deformed at least slightly while the wound core 136 and at least one strap 132 are pressed into a cylindrical mold cavity. An example of one such suitable material is glass-filled nylon material, more particularly described in the above referenced Swaim application. It will be understood also that, if desired, securing means may be spaced about the periphery of the core 136 or other cores previously described.

The securing means 140 of FIG. 11 may also be made of the same material as that used in the FIG. 10 arrangement. However, a relatively deep ground terminal pocket 141 is formed to receive a conventional termination member that will engage the face 142 of core 136 after strap 143 has been placed in recess 137 of the core so as to provide a ground path. Then, fastening means received in apertures 144 will be insulated from the core by the strap 143 rather than engaging the same to provide a ground path as is done with the securing means shown in FIG. 10. Termination pockets 146 may then be used in known fashion to support connections that are made with windings carried by the core to which means 140 are fastened.

Figure 13:
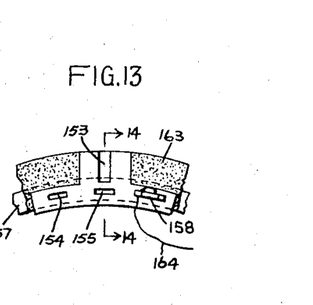
FIG. 13 is an end view of the structure of FIG. 12, and also shows a substantially rigid particulate material mass.

FIGS. 12-14 show still another embodiment wherein an insulating body, formed in situ, is provided with securing means. Formed in situ insulating members are described, inter alia, in more detail in the referenced Swaim patent and will therefore not be further elaborated on herein. The securing means 151 on core 152 may again be formed of the above mentioned glass-filled nylon material or other suitable materials as taught by Swaim in his referenced patent.

It will be noted that fastener receiving apertures 153 and terminal pockets 154–156 are all directed in a common direction to facilitate molding thereof (as in the case of the securing means of FIGS. 10 and 11) and that pocket 155 extends to the face 157 of the core 152 so that a terminal carried therein can establish a grounding path for core 152. Although only terminal 158 has been shown, it will be understood that at least two terminals will normally be provided. In addition, as many terminals as desired may be provided with the above described embodiments to provide for energization of auxiliary winding or extended winding sections (e.g., see block 133 in FIG. 10).

Referring again now to FIG. 12, plugs in suitable mold parts (such as mold parts 161, 162 of FIG. 14) may be used to prevent particulate and resinous material 163 from filling apertures 153. Normally, of course, terminals such as terminal 158 will have already been connected to a lead wire 164 and placed in receptacles such as receptacles 134, 141, 146, and 154–156 prior to placement in a mold cavity formed, e.g., by mold parts 161, 162. As previously suggested, however, receptacles such as pockets 154, 155 have been shown empty for purposes of description.

In all of the just described embodiments, securing means have been provided that are new and improved in form. For example, economical plastic or steel straps may now be used without requiring that such straps, as a matter of necessity, be welded to a stator core.

In view of the foregoing, it will be manifest that the advantages and features of this invention are numerous. For example, motors embodying the invention are characterized by improved dissipation of heat generated during operation of the motor and of heat transferred to the motor during operation by pumped fluids that have been heated externally of the motor. Such motors are further characterized by improved structural integrity, and corrosion resistant characteristics. The housing is constructed of a preferred low moisture absorption material, and the finished bore is defined by a material that is impervious to pumped fluids. In addition, new and novel securing mans and methods of making motors have been described.

In accordance with the Patent Statutes, I have described what at present is considered to be the preferred and alternate embodiments of my invention, but it will be obvious to those skilled in the art that numerous changes and modifications may be made therein without departing from the invention.

What I claim as new and desire to secure by Letters Patent of the United States is:

1. A structural assembly comprising a dynamoelectric machine stator assembly; a movable assembly; at least one bearing means for mounting the assemblies for relative motion; a substantially rigid member formed for connecting the at least one bearing means and stator assembly together, for protecting the stator assembly from impact loads applied to the dynamoelectric machine, and for aiding in the effective dissipation of heat from the stator assembly generated during operation of the dynamoelectric machine; and securing means embedded in the substantially rigid member to provide for fastening together the dynamoelectric machine with another device; said substantially rigid member including an impact resistant self-supporting substantially rigid mass of inert particulate material held together and secured to the stator assembly, said substantially rigid member providing effective heat dissipation when the dynamoelectric machine is operated, and said substantially rigid member comprising from about 65 to about 80 percent by weight of inert particulate material and from about 20 to about 35 percent by weight of resinous material, and the particulate material comprises at least about 50% by weight 40 to 100 mesh size particles said securing means includes a plastic member having at least one aperture for receiving a fastening means.

2. The structure of claim 1 wherein said securing means includes termination locating means.

3. The structure of claim 2 wherein said securing means is a plastic device molded against the stator assembly.

4. The structure of claim 3 wherein said stator assembly includes a magnetic core having at least one peripheral recess and the securing means comprises a member having at least a portion thereof located in the at least one peripheral recess.

5. The structure of claim 4 wherein the securing means is formed of metallic material and at least a portion thereof is tightly held in the at least one peripheral recess.

6. A dynamoelectric machine comprising a stator assembly including a stator core and at least one winding; a movable assembly; at least one bearing means for mounting the assemblies for relative motion; a self-supporting substantially rigid mass of material forming a member useable for connecting the at least one bearing means and stator assembly together, and for aiding in the effective dissipation of heat from the stator assembly during operation of the dynamoelectric machine; an barrier means for isolating the stator core from fluids admitted to the interior of the dynamoelectric machine; said rigid mass of material including resinous material and inert particulate material, the particulate material comprising at least about 50% by weight 40 to 100 mesh size particles that are held together and secured to the stator assembly by the resinous material; the substantially rigid mass of material comprising from about 65 to about 80 percent by weight of inert particulate material and from about 20 to about 35 percent by weight of resinous material; the movable assembly being mounted in spaced relation to the stator assembly and forming an axially extending air gap with the finished bore of the machine; the dynamoelectric machine further comprising an end frame extending across one end of the finished bore and secured to the housing means; said end frame defining a number of spaced apart openings in axial alignment with the air gap to provide an unobstructed path between the air gap and the openings in the end frame, said openings being of a predetermined size access is provided to the air gap for removing shim means therefrom during assembly of the dynamoelectric machine components.

7. A dynamoelectric machine comprising a stator assembly including a stator core and at least one winding; a movable assembly; at least one bearing means for mounting the assemblies for relative motion; a self-supporting substantially rigid mass of material forming a member useable for connecting the at least one bearing means and stator assembly together, and for aiding in the effective dissipation of heat from the stator assembly during operation of the dynamoelectric machine; and barrier means for isolating the stator core from fluids admitted to the interior of the dynamoelectric machine; said rigid mass of material including resinous material and inert particulate material, the particulate material comprising at least about 50% by weight 40 to 100 mesh size particles that are held together and secured to the stator assembly by the resinous material; the substantially rigid mass of material comprising from about 65 to about 80 percent by weight of insert particulate material and from about 20 to about 35 percent by weight of resinous material; the stator core comprising a plurality of laminations defining a bore through the stator core, and the barrier means in a form of a sleeve lining the bore through the stator core and defining at least a portion of the finished bore of the machine.

* * * * *